United States Patent
Mitra et al.

(10) Patent No.: US 10,097,000 B2
(45) Date of Patent: Oct. 9, 2018

(54) TOOL EMPLOYING HOMOTOPY-BASED APPROACHES IN FINDING THE CONTROLLING UNSTABLE EQUILIBRIUM POINT IN THE ELECTRIC POWER GRID

(71) Applicant: Board of Trustees of Michigan State University, East Lansing, MI (US)

(72) Inventors: Joydeep Mitra, Okemos, MI (US); Mohammed Ben-Idris, East Lansing, MI (US); Niannian Cai, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 573 days.

(21) Appl. No.: 14/823,531

(22) Filed: Aug. 11, 2015

(65) Prior Publication Data

US 2016/0041232 A1    Feb. 11, 2016

Related U.S. Application Data

(60) Provisional application No. 62/035,676, filed on Aug. 11, 2014.

(51) Int. Cl.
*H02J 3/24* (2006.01)
*H02J 3/00* (2006.01)

(52) U.S. Cl.
CPC ........... *H02J 3/24* (2013.01); *H02J 2003/001* (2013.01); *Y02E 60/74* (2013.01); *Y04S 10/30* (2013.01)

(58) Field of Classification Search
CPC .... H02J 3/008; H02J 3/00; H02J 3/02; H02H 3/06; G01S 13/723; G01R 31/40
See application file for complete search history.

(56) References Cited

U.S. PATENT DOCUMENTS

| 5,483,462 A | * | 1/1996 | Chiang | ................... H02H 3/06 307/132 EA |
| 6,745,109 B2 | | 6/2004 | Kojima et al. | |
| 7,180,443 B1 | * | 2/2007 | Mookerjee | ............ G01S 13/723 342/162 |

(Continued)

OTHER PUBLICATIONS

Jaewook Lee, "A Novel Homotopy-Based Algorithm for the Closest Unstable Equilibrium Point Method in Nonlinear Stability Analysis", IEEE 2003.*

(Continued)

*Primary Examiner* — Kandasamy Thangavelu
(74) *Attorney, Agent, or Firm* — Harness, Dickey & Pierce, PLC

(57) ABSTRACT

The analysis tool employs a computer-implemented algorithm that uses homotopy-based approaches to map the solution from the exit point to the controlling unstable equilibrium point (UEP). The computational time is reduced significantly by using an approximate exit point rather than computing an accurate exit point as it is required in finding the controlling UEPs using traditional transient stability direct methods. In addition, this method eliminates the necessity of computing the minimum gradient point (MGP) which is a key element in using Newton methods. These properties provide an advantage to homotopy-based approaches over traditional iterative methods in terms of both speed of computation and reliability of finding solutions.

18 Claims, 8 Drawing Sheets

(56) References Cited

U.S. PATENT DOCUMENTS

| | | | |
|---|---|---|---|
| 8,055,358 B2 | 11/2011 | Blevins et al. | |
| 8,055,598 B1 | 11/2011 | Freeman et al. | |
| 9,335,748 B2 | 5/2016 | Francino et al. | |
| 2004/0039490 A1 | 2/2004 | Kojima et al. | |
| 2006/0111860 A1* | 5/2006 | Trias | H02J 3/00 702/85 |
| 2006/0190227 A1* | 8/2006 | Chiang | H02J 3/008 703/13 |
| 2007/0168057 A1 | 7/2007 | Blevins et al. | |
| 2008/0103630 A1* | 5/2008 | Eckroad | H02J 3/02 700/286 |
| 2012/0010757 A1 | 1/2012 | Francino et al. | |
| 2014/0032138 A1* | 1/2014 | Shrestha | G01R 31/40 702/58 |
| 2015/0088439 A1 | 3/2015 | Coffrin et al. | |

OTHER PUBLICATIONS

Kohshi Okumura et al. "A Computation of Power System Characteristic by General Homotopy and Investigation of Its Stability", IEEE 1992.*

Mary Tolikas et al. "Homotopy Methods for Solving Decoupled Power Flow Equations", IEEE 1992.*

S. X. Guo et al., "The Homotopy Continuation Method to Approach Voltage Collapse of Electric Power Systems", IEEE 1993.*

Hsiao-Dong Chiang: "Numerical Network-Perserving BCU Method," Direct Methods for Stability Analysis of Electric Power Systems, 2011, pp. 300-325.

Mohammed Benidris et al.: "A Fast Transient: Stability Screening and Ranking Tool," *Power Systems Computation Conference (PSCC)*, 2014, Aug. 2014, 7 pages.

Hsiao-Dong Chiang et al.: "Stability Regions of Nonlinear Autonomous Dynamical Systems," IEEE Transactions on Automatic Control, vol. 33, No. 1, Jan. 1988, pp. 16-27.

Zhenyi Ji et al.: "Constructing the Lyapunov Function through Sovling Positive Dimensional Polynomial System," Journal of Applied Mathematics, vol. 2013, Nov. 2013, 5 pgs.. 2013. doi:1031155/2013/859578.

F. Wesley Wilson, Jr: "The Structure of the Level Surfaces of a Lyapunov Function," Journal of Differential Equations, vol. 3, 1967, pp. 323-329.

Alex Borisevich et al.: "Switching Strategy Based on Homotopy Continuation for Non-Regular Affine Systems with Application in Induction, Motor Control," CoRR, abs/1203.5919, 24 pages.

Eric Hanson: "On Using Numerical Algebraic Geomery to Find Lyapunov Functions of Polynomial Dynamical Systems." Dynamics at the Horsetooth, vol. 2, 2010, 5 pgs.

Hsiao-Dong Chiang: "Foundations of Direct Methods for Power System Transient Stability Analysis," IEEE Transactions on Circuits and Systems, vol. CAS-34, No. 2, Feb. 1987, pp. 160-173.

Hsiao-Dong Chiang et al.: "Foundations of the Potential Energy Boundary Surface Method for Power System Transient Stability Analysis," IEEE Transactions on Circuits and Systems, vol. 35, No. 6, Jun. 1988, pp. 712-728.

Licheng Jin et al.: "An Application of Reachable Set Analysis in Power System Transient Stability Assessment," Power Engineering Society General Meeting, 2005. IEEE, pp. 1715, 1719, vol. 2, pp. 12-16 Jun. 2005, 7 pages.

North American Electric Reliability Council: "Technical Analysis of the Aug. 14, 2003, Blackout: What Happened, Why and What Did We Learn?" Report to the NERC Board of Trustees by the NERC Steering Group, Jul. 13, 2004, 124 pages.

Data structure—What is a matrix?; Ghai, R.; https://web.archive.org/web/20120402184904//http://www.careerride.com/Data-structu re-matrix-and-its-uses.apsx; pp. 1-2.

"Three-Phase Fast Decoupled Power Flow for Distribution Networks"; Garcia, A.V.; IEE Proceedings—Generation, Transmission and Distribution, vol. 143, Issue 2 [online], Mar. 1996 [retrieved Apr. 29, 2017], Retrieved From Internet: <URL:http://ieeexplore.ieee.org/abstract/document/488155/>, pp. 188-192.

"The IV Formulation and Linear Approximations of the AC Optimal Power Flow Problem"; O'Neill R; Federal Energy Regulator Commission [online], 2012 [retrieved Apr. 30, 2017], https://www.ferc.bov/industries/electric/indus-act/market-planning/opf-papers/acopf-2-iv-inearization.pdf, pp. 1-18.

Data Structure Definition, The Linus Information Project [online], 2006 [retrieved Apr. 27, 2017], http://www.linfo.org/data_structure.html, pp. 1-2.

"Real Power Loss Allocation Using Modified Nodal Equation for Deregulated Power System", Mustafa, M, Preceedings of the 19th Australasian Universities Power Engineering Conference [online], 2009 [retrieved Apr. 30, 2017], http://ieeexplore.ieee.org/document/5356593/#full-text-section, pp. 1-6.

* cited by examiner

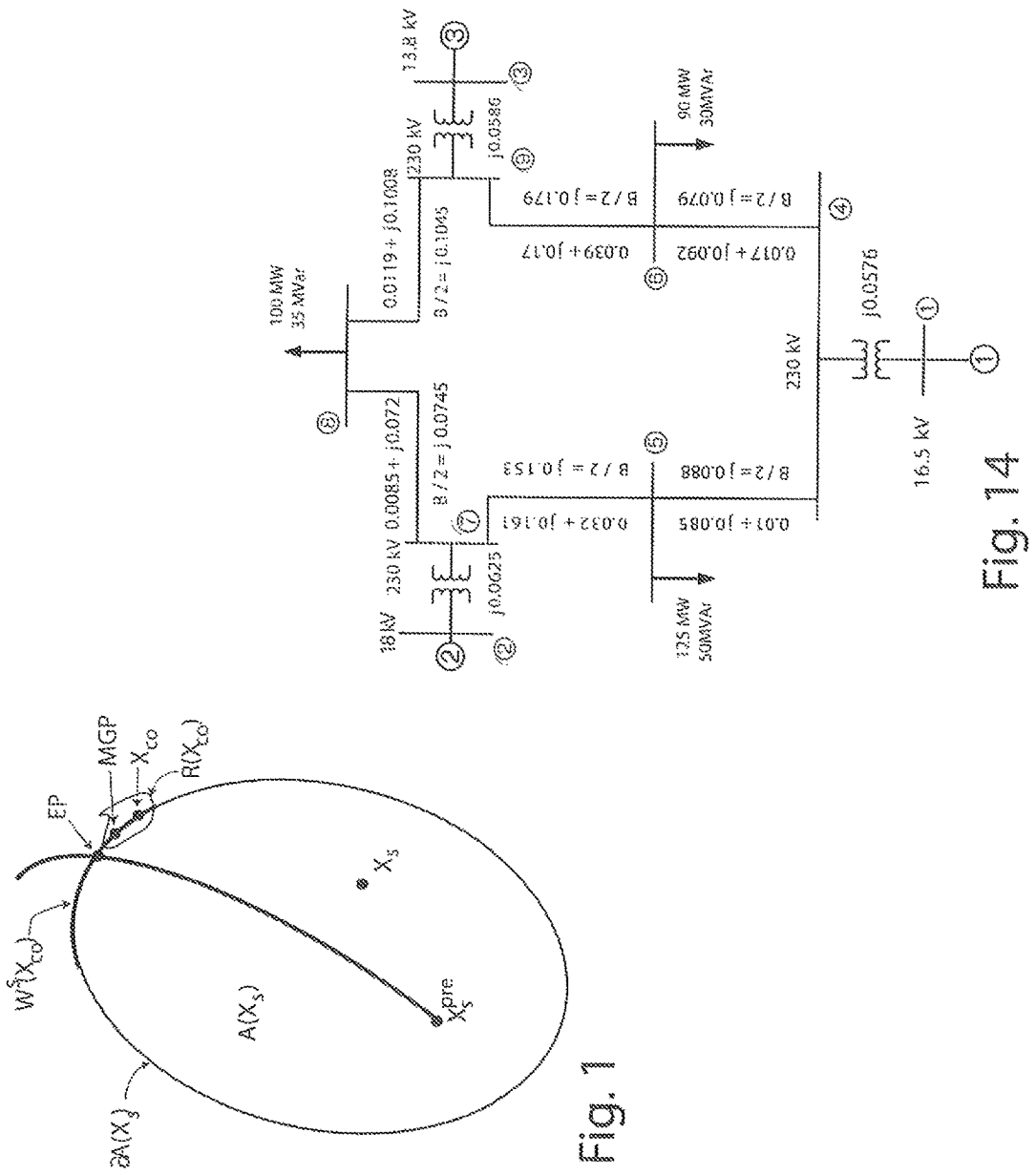

TOOL EMPLOYING HOMOTOPY-BASED APPROACHES IN FINDING THE CONTROLLING UNSTABLE EQUILIBRIUM POINT IN THE ELECTRIC POWER GRID

CROSS-REFERENCE TO RELATED APPLICATIONS

This application claims the benefit of U.S. Provisional Application No. 62/035,676 filed on Aug. 11, 2014. The entire disclosure of the above application is incorporated herein by reference.

GOVERNMENT RIGHTS

This invention was made with government support under DE-OE0000625 awarded by the U.S. Department of Energy. The government has certain rights in the invention.

FIELD

The present disclosure relates to the use of homotopy-based approaches in finding the controlling unstable equilibrium point.

BACKGROUND

This section provides background information related to the present disclosure which is not necessarily prior art.

One hot summer day on Aug. 14, 2003, with air conditioner demand for power high, the generating plant in Eastlake, Ohio, a suburb of Cleveland, went offline. This was at 1:31 pm. About thirty-minutes later a 345 kV high voltage line in a small town in Northeast Ohio, made contact with a tree, causing a short. This happened at 2:02 pm. Thereafter, at 3:05 pm another 345 kV line sagged into an overgrown tree in the town of Parma, south of Cleveland. All this activity caused a dip in the voltage on the Ohio portion of the electric power grid, setting into motion a cascade of further failures that, over the ensuing two hours, ultimately forced hundreds of power plants across New York, New Jersey, Maryland, Connecticut, Massachusetts, Michigan, Ohio and Ontario, Canada to shut down. By 4:13 pm 256 power plants were offline. 50 million people were without power. For many, the power outage lasted days.

The North American Electric Reliability Council, conducted an extensive investigation of the outage and detailed its findings in a report, "Technical Analysis of the Aug. 14, 2013, Blackout: What Happened, Why and What Did We Learn?," Jul. 13, 20014. Instead of attributing the blackout to inanimate events, such as failure of an alarm processor (which had happened) or tree contact with a power line (which had happened), the Council found that the causes of the blackout were "rooted in deficiencies resulting from decisions, actions, and failure to act of the individuals, groups, and organizations involved.

Looking more deeply into why these individuals, groups, and organizations failed to properly react, the Council found, inter alia, that:

System operators did not have an effective contingency analysis capability for identifying contingency limit violations. Thus operators were essentially operating blind, with no way to effectively know which corrective actions would work and which would have worsened the problem.

System operators did not have effective diagnostic support. Critical real-time information about power grid conditions was not available to system operators, so they had no real-time knowledge by which to assess different contingency plans for corrective action. Again, operators were operating blind.

This massive power outage did not happen instantaneously. Rather the outage was a cascade of events over the period of more than one hour. The following are some of those events:

13:31 EDT—Eastlake Unit 5 trips
14:02 EDT—Stuart-Atlanta 345-kV line trips
14:27 EDT—Star-South Canton 345-kV line trips and recloses
14:14 EDT—FirstEnergy control room alarm processor fails
14:20 EDT—FirstEnergy remote console fails
14:41 EDT—FirstEnergy primary server goes offline
15:05 EDT—Chamberlin-Harding 345-kV line trips, recloses, trips again and locks out
15:32 EDT—Hanna-Juniper 345-kV line trips
15:41 EDT—Star-South Canton 345-kV line trips and locks out
15:44 EDT—Babb-West Akron 138-kV line trips and locks out
15:45 EDT—Canton Central-Cloverdale 138-kV line trips and locks out [etc.]

The cascade began as illustrated above; it starting slowly but then quickly spread. The number of lines and generators lost stayed relatively low during the Ohio phase of the blackout, but then picked up speed after 16:08 EDT. The cascade was complete two-and-one-half minutes later. The outage spread from Ohio to Michigan and Ontario. From there it spread eastward along the Pennsylvania border to New York, where it proceeded to take out New Jersey and the eastern seaboard.

During the time the cascade event was happening, system operators might have taken corrective actions to contain the blackout to a local region, if only those operators could have seen a real-time picture of what was happening. Although system operators wanted to take corrective action to save the power grid, they lacked the ability to differentiate what corrective actions would make matters better and what would make matters worse. Thus, armed with the best technology available, these operators were forced to helplessly sit and watch the outage slowly spread and then built at frightening speed as Northeastern and Midwestern United States and Ontario Canada went dark.

In reality, power systems are currently operated close to their limits and transient stability analysis is one of the important tools in determining the operating limits. However, transient stability analysis (TSA) involves the extremely heavy computational burden of solving a large set of nonlinear differential equations. For example, to perform a TSA stability analysis of a 14,000-bus power system, the transient stability model would involve solving a set of some 15,000 differential equations and 40,000 non-linear algebraic equations for a time duration of 10-20 seconds.

An alternative to transient stability analysis involves so called direct methods. Direct methods can determine transient stability without the time-consuming numerical integration of a (post-fault) power system, however direct methods pose different problems arising from the fact that direct methods require that the region of attraction and the controlling unstable equilibrium point (UEP) must be ascertained. Both pose difficulties, since the boundary of the region of attraction (stability boundary) is not a smooth function but irregular, and the controlling UEP must be distinguished from other UEPs. Thus while direct methods of transient stability analysis have been successfully applied in evaluating the stability of power systems and deriving operating limits, the accuracy of these methods strongly relies on the determination of the controlling unstable equilibrium point (UEP). However, the numerical methods for the finding the correct controlling UEP frequently fail due to the presence of fractal shapes of the convergence region of the controlling UEP. To find the correct controlling UEP, using Newton methods for example, requires the—starting point of the search to be within a certain neighborhood of the desired solution. This requirement makes it difficult to find the best starting point and is computationally expensive.

The Newton method and its variations can converge if the initial starting point guess is within the region of convergence of the desired solution. In particular, in finding the correct UEP using traditional methods, the exit point and the minimum gradient point (MGP) have to be calculated first. The exit point is the point at which the projected fault-on trajectory exits the stability boundary of the post-fault stable equilibrium point (SEP). Computationally, the exit point is characterized by the first local maximum of the potential energy of the post-fault network along the projected fault-on trajectory.

Another technique using the Newton method involves detecting the exit point by detecting the change in the sign of the dot product of the post-fault power mismatch vector and the fault-on speed vector. The MGP is numerically characterized by the first local minimum value of the norm of the vector field of the post-fault trajectory. Most of the reported methods use the MGP as an initial point to generate a sequence of steps to find the controlling UEP. The robustness of finding the controlling UEP depends strongly on the accuracy of the calculation of MGP. An inaccuracy in detecting the exit point may cause difficulty in computing the MGP. Moreover, detecting an accurate exit point is computationally involved and sometimes requires the use of interpolation methods after bounding the exit point in a certain range. Thus, numerical inaccuracy in computing the exit point will likely cause failure of numerical methods to calculate the controlling UEP.

Several methods have been proposed to compute the controlling UEP including the Boundary of stability region based Controlling Unstable equilibrium point method (BCU method). However, due to the problems associated with detection of the exit point and consequently determination of the minimum gradient point, the BCU method may fail to find a solution. A continuation-based method that approximates the stability boundary locally and does not use the energy function to compute the controlling UEP was proposed in L. Chen, Y. Min, F. Xu, and K.-P. Wang, "A continuation-based method to compute the relevant unstable equilibrium points for power system transient stability analysis," *IEEE Trans. Power Syst.*, vol. 24, no. 1, pp. 165-172, February 2009. Notwithstanding the widespread use of the direct methods in transient stability analysis, the problem of precise determination of the controlling UEP and the speed of computation are still of concern of many researchers.

Another trend to compute the controlling UEP is to use homotopy-based approaches. Homotopy-based approaches have been successfully applied in computing the closest UEP. See, J. Lee and H.-D. Chiang, "A singular fixed-point homotopy method to locate the closest unstable equilibrium point for transient stability region estimate," *IEEE Trans. Circuits Syst. II*, vol. 51, no. 4, pp. 185-189, April 2004; J. Lee, "A novel homotopy-based algorithm for the closest unstable equilibrium point method in nonlinear stability analysis," *Proceedings of the International Symposium on Circuits and Systems, ISCAS*, vol. 3, pp. III-8-III-11, 2003.

The approaches reported in these papers utilize the strategy of singular fixed-point and the concept of bifurcation to locate the closest UEP. The algorithm proceeds by choosing a set of initial points that, by using homotopy-based approaches, converge to a set of type-1 UEPs. By choosing a set of proper initial points, the resulted set of the type-1 UEPs will include the closest UEP which can be distinguished by having lowest Lyapunov function value. However, closest UEP usually produces conservative results. Thus some have used the continuation-based methods without the use of the energy function and approximating the stability boundary locally. Again, this method gives very conservative results (not optimal) due to locally approximating the stability boundary.

SUMMARY

This section provides a general summary of the disclosure, and is not a comprehensive disclosure of its full scope or all of its features.

The technology disclosed here introduces a new method and an associated fast transient stability screening tool to compute the controlling UEP using homotopy-based approaches. This method uses the exit point as an initial solution to the homotopy-based approach and maps the solution from the exit point to the controlling UEP. In using homotopy-based approach to compute the controlling UEP, the necessity of computing the minimum gradient point (MGP) has been eliminated (this is one of the benefits of the proposed method). Also, this method does not require an accurate exit point as it is required in the iterative methods such as Newton method and its variations. (this is another benefit of the proposed method) Therefore, the disclosed method places far less computation burden on the computer equipment used to implement the method. Therefore, by eliminating the necessity of computing an accurate exit point and the MGP and considering the reliability of the homotopy-based approaches, the intrinsic slow speed of homotopy-based approach can be justified.

The fast screening tool classifies a designated set of contingencies into stable and unstable subsets using transient stability direct methods. The disclosed method utilizes the advantages of the conservativeness of the direct methods to initially classify the designated set of contingencies into stable, "potentially" unstable and undetermined subsets. The potentially unstable subset is further divided into stable, potentially unstable and undetermined subsets along the solution trajectory towards the controlling UEP. The undetermined subset which has numerical problems is checked again using homotopy-based approaches.

The disclosed method checks the stability of different points by direct (Lyapunov) methods to screen out a large number of stable contingencies, and then apply time-domain simulation to check those potentially unstable contingencies. Depending on the speed of the computation and the extent of conservation, this procedure checks stability by sequentially checking energy margin at exit point, minimum gradient point and controlling UEP. If numerical problems, such as convergence issues, are encountered during the computation, the studied contingency is sent to time-domain simulation for stability check.

For example, if the numerical problem is related to the exit point or the homotopy-based approaches fail to find the desired solution, the contingency is sent to the time-domain simulator for further analysis. The homotopy-based approaches are utilized in this work to increase the efficiency of the screening tool and to reduce the number of contingencies that need further analyses using time-domain simulations. The strategy of using transient stability direct methods to filter out a large number of contingencies first and conducting further analysis on a much smaller number of contingencies makes the on-line transient stability screening feasible.

In accordance with one aspect, the inventive method of analyzing the stability of a networked power system, comprises storing a reduced state model of the power system in memory of a computer and integrating over the model to derive a fault-on trajectory; and storing in memory of the computer a numerical energy function for a post-fault condition of the power system. The computer is then used to compute the exit point at which a projected fault-on trajectory reaches a first local maximum of potential energy. Then using this exit point as an initial point the computer then solves the post-fault reduced-state system to determine the controlling unstable equilibrium point (CUEP) with respect to the fault-on trajectory of the original system. It does so by applying a homotopy algorithm that uses the exit point as the initial condition.

Once the CUEP has been determined, the computer then computes a numerical energy function at the CUEP to determine a critical energy value and calculates the value of numerical energy function at a time of fault clearance using an initial condition of the post-fault trajectory. The computer then tests if the value of the numerical energy function is less than the critical energy value:
  (a) if so, reporting that the initial condition lies within the stability boundary; and
  (b) if not, reporting that the initial condition may be unstable.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a graph depicting the region of convergence of the controlling unstable equilibrium points (UEPs) under the use of Newton methods;

FIGS. 2a and 2b (collectively referred to as FIG. 2) illustrate the mapping of the fault-on trajectory (FIG. 1a) to potential energy (FIG. 2b);

FIG. 14 is an exemplary circuit diagram depicting the configuration of a three-machine, nine-bus system;

Corresponding reference numerals indicate corresponding parts throughout the several views of the drawings.

DETAILED DESCRIPTION

Figure 2A:
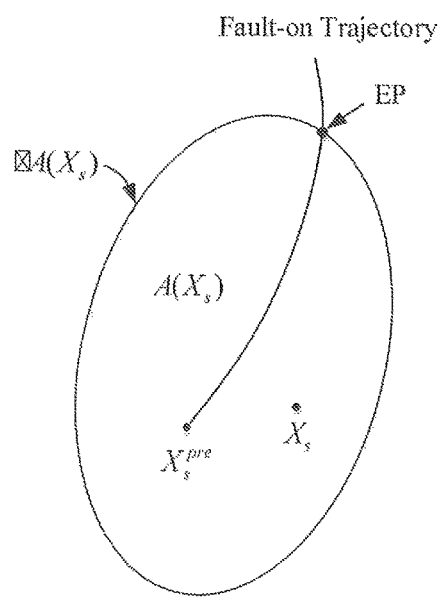

Example embodiments will now be described more fully with reference to the accompanying drawings.

Before discussing an exemplary embodiment of the fast screening tool, a discussion of some of the important system equilibrium and homotopy-based concepts will first be presented. In performing transient stability analysis using direct methods, computing the controlling unstable equilibrium point (UEP) is very crucial. The controlling UEP is a UEP whose stable manifold, $W^s(X_{co})$, contains the exit point. The exit point is the point at which the projected fault-on trajectory exits the stability boundary of the post-fault stable equilibrium point (SEP).

The disclosed technology introduces the concept of using homotopy-based approaches in finding controlling unstable equilibrium points (UEPs). The method overcomes the problem of irregularity of the region of convergence of the controlling UEP and its sensitivity to the initial points that iterative methods (such as Newton methods) face in computing the controlling UEP. The intrinsic low speed of mapping an easy and known solution to the desired solution of homotopy-based approaches is justified by using approximate exit points as initial points and eliminating the necessity of computing the MGP and using an adaptable step size.

Characterization of the Region of Convergence of the Controlling UEPs

The region of convergence of an equilibrium point can be defined as: if the initial point is inside the region of convergence, a numerical method succeeds in finding the solution and it fails if the initial point lies outside this region. The size and shape of the region of convergence of a controlling UEP can be very fractal and different for different numerical methods. Therefore, if the initial point is not in the region of convergence of a controlling UEP, numerical methods such as Newton methods fail to find the correct controlling UEP. In other words, to find the correct controlling UEP, the initial point has to be sufficiently close to the controlling UEP. With Newton methods, the initial point can be the minimum gradient point MGP. Numerically, it is not an easy task to find an accurate MGP, and therefore Newton methods may fail in finding the correct controlling UEP. The MGP may not exist or it may be difficult to find if the accurate exit point cannot be determined. The shape of the region of convergence of a controlling UEP is shown in FIG. 1.

In FIG. 1 the region of convergence of the controlling UEPs under the use of Newton methods has been illustrated. EP is the exit point, MGP is the minimum gradient point, $X_{co}$ is the controlling UEP, $A(X_s)$ is the region of attraction (stability) of the post-fault stable equilibrium point ($X_s$), ∂A($X_s$) is boundary of the region of attraction, R($X_{co}$) is the region of convergence of the controlling UEP under Newton method, $W^s(X_{co})$ is the stable manifold of the controlling UEP and $X^{pre}_s$ is the pre-fault stable equilibrium point.

To overcome the difficulty of finding an initial point inside the region of convergence, our disclosed method uses a particular homotopy-based approach. While homotopy-based approaches are known to be reliable in finding the solutions, one potential drawback is the inherent low speed of finding a solution. In our proposed technique the problem of the low speed is overcome by using a rapidly computed approximate exit point as starting point, eliminating the necessity of computing the MGP and utilizing adaptable mapping step size, as will be more fully described below.

Calculation of the Controlling UEP

The controlling UEP using fault-on trajectory, is the UEP whose stable manifold, W s(Xco), contains the exit point of the fault-on trajectory. Computing the controlling UEP is crucial because the energy at controlling UEP is used in computing the critical energy to assess the stability of the system. The dynamics of a power system can be described as a set of dynamic equations:

$$\dot{x}=F(x) \quad (1)$$

A state vector x* is called an equilibrium point of the dynamic system of (1) if F(x*)=0. The controlling UEP is one of the unstable equilibrium points, but it is not an easy task to determine and distinguish it from the other unstable equilibrium points. A popular method to compute a controlling UEP is to use time-domain simulation of the projected fault-on trajectory to obtain the exit point and minimal gradient point (MGP), and then use the MGP as an initial point to find the controlling UEP by Newton's method. As it was mentioned earlier, if an inaccurate exit point is used to find the MGP and then determine the controlling UEP, it is quite likely the algorithm will not converge to the controlling UEP. Most of the methods in the literature integrate the fault-on trajectory using a large time step until the algorithm locates the exit point between two time steps. The algorithm then bounds this point and starts searching for the exit point using some tools, such as the golden section, linear or quadratic interpolation. Once a more accurate exit point is discovered, the algorithm uses this point as an initial point to compute the MGP and then the controlling UEP. Therefore, we can see that it requires significant efforts to compute the exit point and the MGP. In this context, the homotopy-based approaches can be used to eliminate the requirement of computing an accurate exit point and avoiding the use of MGP. As it is shown in the example below, a controlling UEP can be obtained by using homotopy-based approaches with an approximate exit point as an initial point rather than an accurate exit point. This method is more robust and computationally inexpensive because it does not require computation of MGP and avoids possible convergence problems brought from the iterative methods.

Figure 2B:
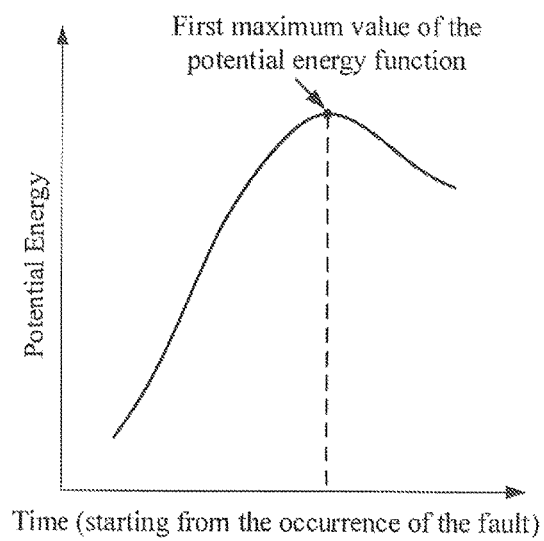

Calculation of the exit point: The exit point is calculated by integrating the fault-on trajectory of the system starting from the pre-fault conditions. The exit point represents the point (power angles of the generators) at which the potential energy function of the post-fault system configuration reaches its first maximum point. The mapping of the fault-on trajectory (FIG. 2a) to the potential energy (FIG. 2b) is shown in FIG. 2. During the integration process, the algorithm searches for a point at which the potential energy value at the points before and after it are smaller than this point.

Homotopy Method

Traditional methods of solving (1) include the use of Newton's methods. Newton's methods, although computationally sound, will only converge to a solution if the initial point is within the neighborhood of the convergence region of the desired solution. Homotopy methods were developed to overcome the local convergence of Newton's methods since they are globally convergent. That is, these methods are guaranteed to converge to a solution regardless of an initial starting point provided that there are no singularities, bifurcation points, or turning points in its path. In the case where there may be multiple equilibrium points, the homotopy method has the ability to find those solutions.

Homotopy is a numerical method to solve and find the roots of non-linear systems (F(x)=0). It is also called continuous Newton's method. Homotopy is known to be a reliable method to find solutions and it is not sensitive to the initial conditions in contrast with the other iterative methods such as Newton methods. However, when multiple solutions exist, a better initial condition can help to obtain the solution of interest first. Shown in FIG. 1, exit point and minimal gradient point are two points near controlling UEP on the stable manifold of the controlling UEP, W s(Xco).

Computing an accurate exit point, is not an easy task and computing the minimal gradient point, MGP, depends on the accuracy of the exit point. The disclosed technology proposes a method that uses a less accurate exit point as an initial point to obtain the controlling UEP by homotopy-based approaches. The logic behind this method is that with an exit point as the initial point, homotopy-based approaches can find the controlling UEP first since its location is the closest to the exit point in terms of the energy value.

The basic idea of the Homotopy method is to find the solutions by path continuation, starting at a known solution x0 that satisfies G(x0)=0. The Homotopy method traces the solution trajectory by a predictor-corrector algorithm to get a solution of the original equation. The most widely used homotopy function is expressed as follows, $$H(x,t)=tF(x)+(1-t)G(x)=0 \quad (2)$$

where t changes from 0 to 1 with an incremental step-size through the mapping process, i.e., H(x, 0)=G(x) and H(x, 1)=F(x).

G(x) can be chosen arbitrary as long as it has a known solution. However, the most widely used homotopy functions are as follows, Fixed Point Homotopy $$G(x)=x-x0 \quad (3)$$

Therefore, the homotopy function becomes, $$H(x,t)=tF(x)+(1-t)(x-x0)=0 \quad (4)$$

Newton Homotopy $$G(x)=F(x)-F(x0) \quad (5)$$

where $x^0$ can be any starting point. Therefore, the homotopy function becomes, $$H(x,t)=F(x)-(1-t)F(x^0)=0 \quad (6)$$

The Concept of Filtering and the Set of Homotopy-Based Approaches

Screening and classification processes require sophisticated programs that can meet the requirements of on-line applications. The existing on-line transient stability analysis tools based on transient stability direct methods have introduced several system dependent thresholds for classifications. These thresholds are used to classify a set of contingencies into stable, unstable or undetermined subsets. The undetermined contingencies are the contingencies that have numerical convergence problems such as failure to calculate the controlling unstable equilibrium point, controlling UEP. In order for these thresholds not to fail in classifying the contingencies, off-line transient stability analyses are required. Also, for the unstable or undetermined contingencies, detailed time-domain simulations are performed. Therefore, these methods require off-line transient stability assessments and may excessively use time-domain simulations.

Several criteria and requirements are suggested in the literature for any on-line transient stability screening candidate. In H. Chiang, C. Wang and H. Li, "Development of BCU Classifiers for On-Line Dynamic Contingency Screening of Electric Power Systems," IEEE Trans. on Power System, Vol. 14, no. 2, pp. 660-666, May 1999, five requirements were suggested for any on-line transient stability screening tool. These requirements are, reliability measure, efficiency measure, on-line computation, speed measure and performance measure. The reliability measure is defined as the absolute capture of the unstable contingencies. Efficiency measure indicates the ratio between the detected stable contingencies to the actual number of stable contingencies. On-line computation measure can be defined as little need of off-line computations. Speed measure is used to evaluate computation speed. Performance measure tests robustness of the proposed tool against the changes in operating conditions. The reliability, efficiency and performance measures are related to the screening tool itself. On the other hand, on-line computation and speed measure are comparable indices that can be used to compare between two alternatives for example.

Our disclosed transient stability screening tool checks stability by sequentially calculating exit point and controlling UEP for each contingency. In this stage of developing the proposed screening tool, the tool is not intended to check the stability of the contingencies at the exit points as most of the current contingency screening tools do. In this stage, the work is intended to test the screening procedures with the introduction of the use of the homotopy-based approaches. Several methods can be used to increase the speed of computation such as using some indicators and thresholds to drop off, at the early stages of screening, mild contingencies, i.e. highly stable contingencies.

The homotopy-based approach is adopted in the proposed screening tool to calculate the desired solution: the controlling UEP. In transient stability screening of large systems, numerical problems in calculating pre-fault SEPs, exit points, MGPs and controlling UEPs are expected to be encountered. In the exiting transient stability screening tools using direct methods, if the iterative methods fail to converge to the desired solution, time-domain simulations are performed to check the stability. Therefore, if the number of contingencies that have numerical problems is very large, an excessive use of time-domain simulations is required and the screening tool may not meet the requirements of on-line applications.

Several different indicators to test the convergence of the solution have been used. Two indicators have been used in detecting the convergence problems in calculating the post-fault SEP. These indicators are the maximum number of iterations which has been assumed to be 5 iterations, and the maximum angle difference between the pre-fault SEP and post-fault SEP which has been assumed to be 30°. Also, two indicators have been used in detecting a numerical convergence problem in calculating the controlling UEP which are the maximum number of iterations and the maximum angle difference between the MGP and the computed controlling UEP. The maximum number of iterations has been assumed 10 iterations and the maximum angle difference has been assumed 120°.

Transient Stability Screening Procedures

Figure 11:
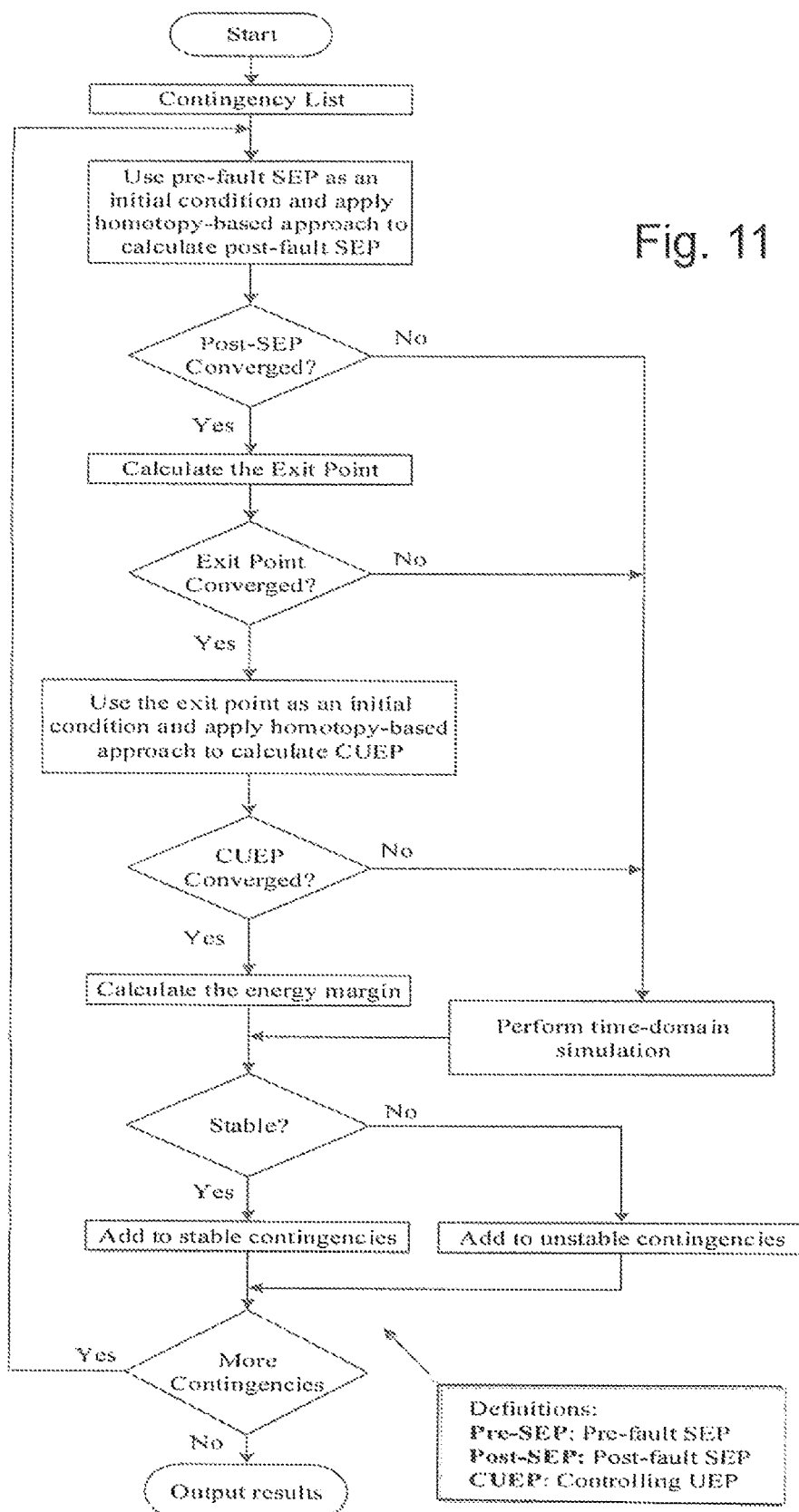
FIG. 11 is a flowchart illustrating one embodiment of the fast screening stability analysis tool.

The concept of transient stability filtering is depicted in FIG. 11. The inputs of the screening tool are taken from the system state estimator and a designated set of contingencies. From the output of the screening tool, the unstable contingencies are sent to a remedial action tool (not shown). The screening procedures start with calculating the post-fault SEP for each contingency using the homotopy-based approach. If the homotopy-based approach succeeds to find the solution, the program proceeds to calculate the exit point and if it fails, the program sends the contingency to the time-domain simulator.

If the exit point has been found, the program proceeds to calculate the controlling UEP; otherwise it sends the contingency to the time-domain simulator. The program sends the contingency to the time-domain simulator for the case of failure of finding the exit point because without knowing the exit point, neither the iterative methods nor the homotopy-based methods can converge to the controlling UEP. If the algorithm succeeds to calculate the controlling UEP, the program uses the energy margin as a criterion for classifying the contingency either as stable or as unstable. If the homotopy-based approach fails to calculate the controlling UEP, time domain simulation is performed. The stable and unstable contingencies are classified into two separate subsets. If all the contingencies in the list are scanned, the program outputs the results; otherwise it continues to the next contingency.

Exemplary System Implementation

Figure 12:
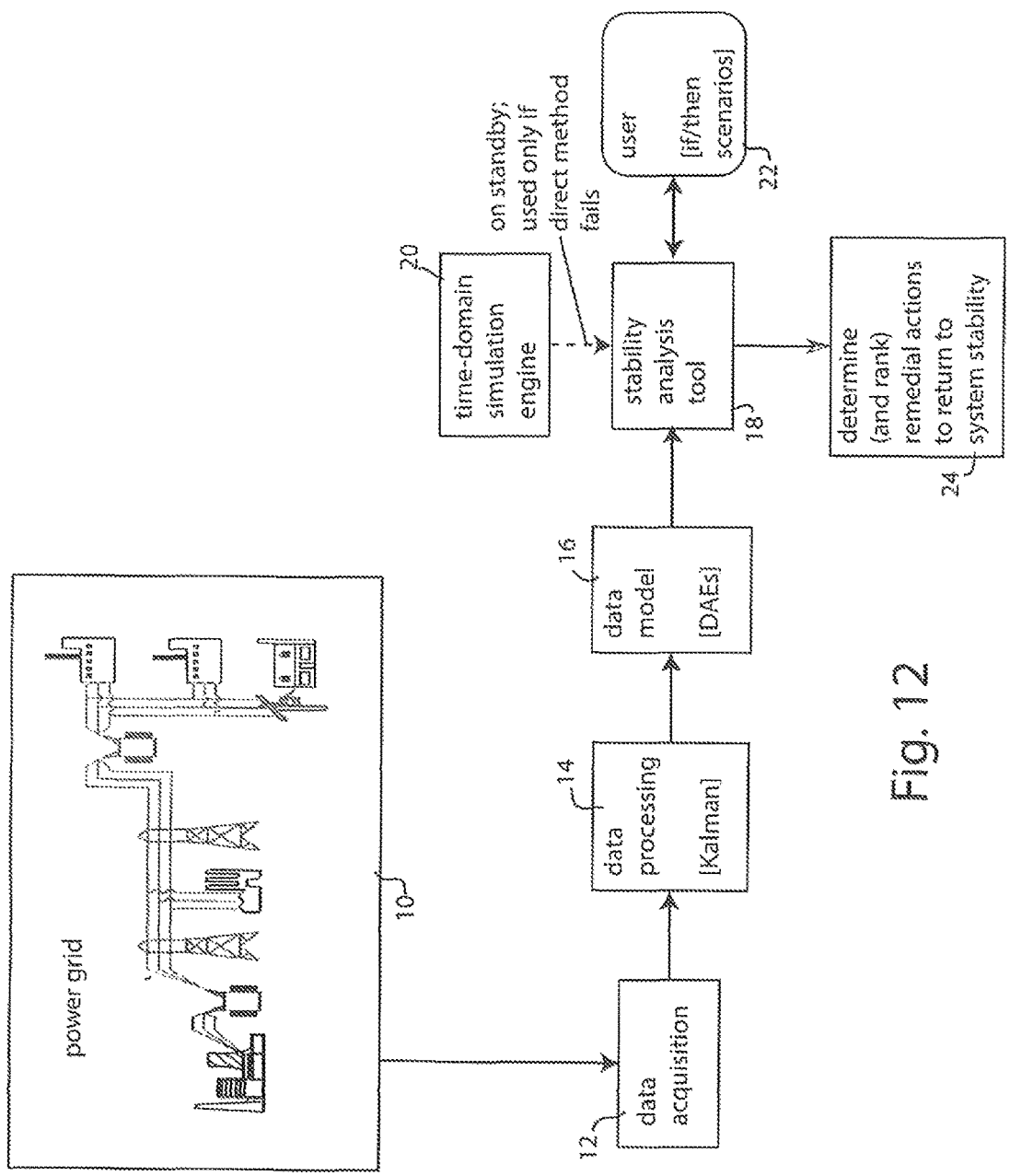
FIG. 12 is a block diagram illustrating how the fast screening stability analysis tool is deployed in stability assessment of a power grid.

Referring to FIG. 12, an exemplary deployment of the fast transient stability screening tool has been illustrated. The power grid, shown diagrammatically at 10, is monitored by a data acquisition system 12, which may be implemented, for example, using on-line monitoring and/or resistance-temperature detector units coupled via internet streaming. If desired this real-time data can be further processed by a data processing computer 14, optionally performing Kalman filtering or other suitable data processing to perform error correction. For example static state estimation methods, such as weighted least square estimation may be performed by computer 14 to generate clean, time-stamped data.

The data collected are then used to populate a data model 16, also implemented by computer which expresses the state of the power grid as a set of differential-algebraic equations (DAEs) of the form:

$$x'=f(x,Z)$$

$$0=h(x,z).$$

These equations are preferably solved at small time increments to ensure minimization of errors to numerically integrate computationally-stiff ordinary differential equations (ODEs). The number of equations required to solve the DAEs for transient stability analysis is massive, and very sparse. For instance, if there are twenty differential equations to describe each generator within the power grid, and two equations to describe the complex voltage/current at each network bus, then a state-wide or regional interconnected power grid with 2,000 buses and 300 generators could generate a sparse irregular system of 10,000 nonlinear algebraic equations that must be solved simultaneously. Performing such calculations, to explore all different stability contingencies under consideration, is a daunting and computationally expensive undertaking. Fortunately, that is where the disclosed stability analysis tool comes into play.

Shown at 18, the stability analysis tool implements the homotopy-based techniques described here to allow a user 22 to submit different if/then scenarios, which are then ranked by the tool 18 as depicted at 24. The tool 18 makes use of an associated time-domain simulation engine by which certain ones of the solutions are tested. See FIG. 11 which shows at which points the tool performs time-domain simulation.

If desired a non-transitory computer-readable medium may be used to store instructions which when read and operated upon by a processor associated with the data processing computer 14 cause the processor to perform the processes depicted in FIG. 11 and also FIG. 13 (discussed below).

While different embodiments are possible, we illustrate here a homotopy-based approach that uses a boundary of stability and the exit point as guidance to calculate the controlling UEP in the computer implementation. Under our proposed method the computer does not compute the controlling unstable equilibrium point directly, as doing so would involve a heavy computational burden. Instead we use the reduced-state model that captures all the equilibrium points on the stability boundary of the original power system stability model:

$$0 = -\frac{\partial U}{\partial u}(u, w, x, y) + g_1(u, w, x, y) \quad (7)$$

$$0 = -\frac{\partial U}{\partial w}(u, w, x, y) + g_2(u, w, x, y)$$

$$T\dot{x} = -\frac{\partial U}{\partial x}(u, w, x, y) + g_3(u, w, x, y)$$

$$\dot{y} = z$$

$$M\dot{z} = -Dz - \frac{\partial U}{\partial y}(u, w, x, y) + g_4(u, w, x, y)$$

The CUEP of the original model is computed by computing the CUEP of the following reduced-state model (Eq. 8). This can be computed without resorting to the time-domain approach:

$$0 = -\frac{\partial U}{\partial u}(u, w, x, y) + g_1(u, w, x, y) \quad (8)$$

$$0 = -\frac{\partial U}{\partial w}(u, w, x, y) + g_2(u, w, x, y)$$

$$T\dot{x} = -\frac{\partial U}{\partial x}(u, w, x, y) + g_3(u, w, x, y)$$

$$\dot{y} = -\frac{\partial U}{\partial y}(u, w, x, y) + g_4(u, w, x, y)$$

A numerical energy function for the original model is as follows. It is the summation of a numerical potential energy and kinetic energy:

$$W_{num}(u, w, x, y, z) = W_{ana}(u, w, x, y, z) + U_{path}(u, w, x, y) \quad (9)$$

$$= \frac{1}{2}z^T M z + U(u, w, x, y) + U_{path}(u, w, x, y)$$

$$= \frac{1}{2}z^T M z + U_{num}(u, w, x, y)$$

Figure 13:
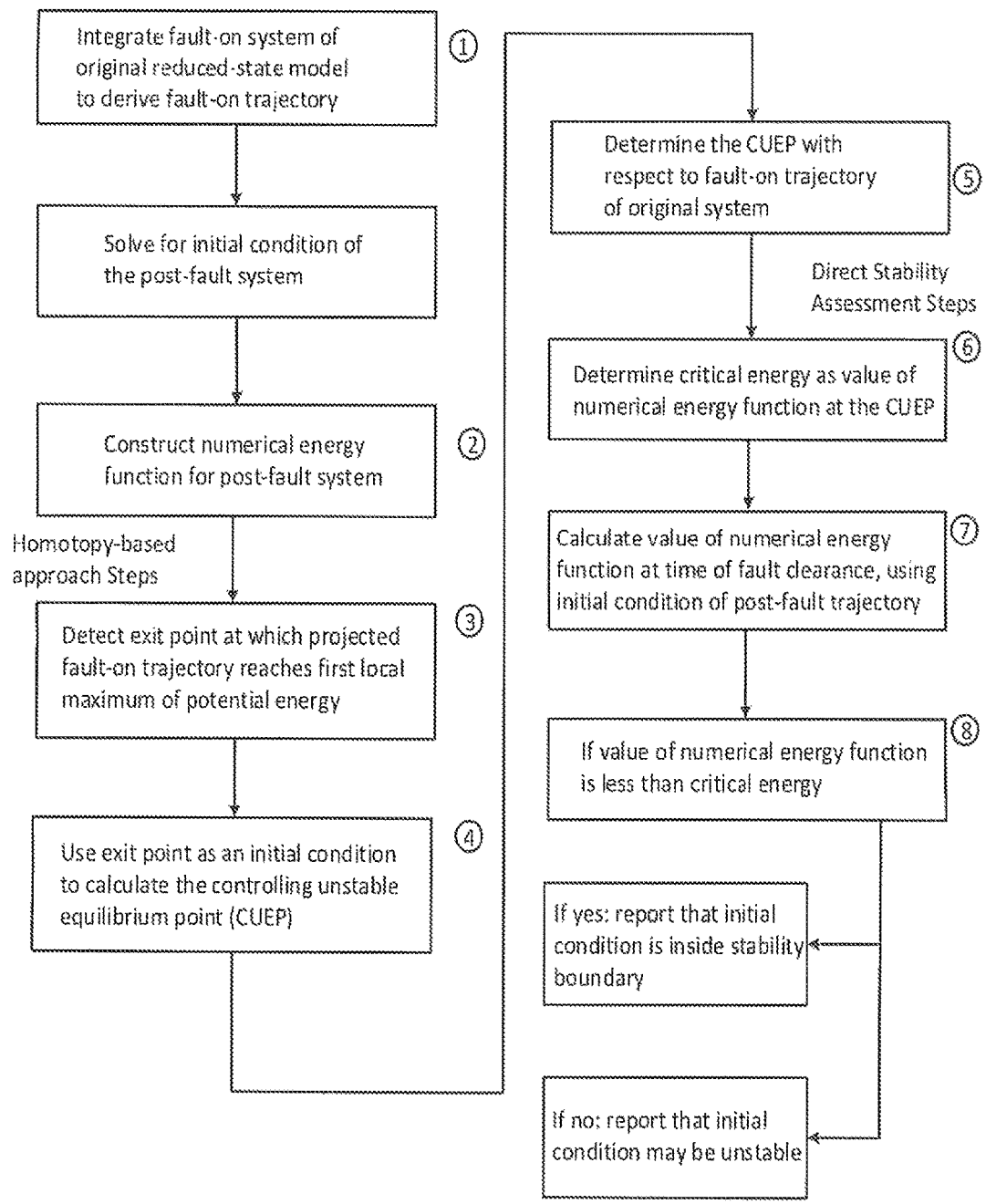
FIG. 13 is a flow diagram depicting one embodiment of the proposed screening tool for implementing the homotopy-based approach.

Referring now to FIG. 13, the proposed screening tool performs the following steps.

Model Preparation Steps

Step 1. Integrate the fault-on system of the original model (Eq. 8) to derive the fault-on trajectory ($u_f(t)$, $w_f(t)$, $x_f(t)$, $y_f(t)$, $z_f(t)$) for a few time steps. At each time step, solve the for the initial condition of the post-fault system, say, ($u(t_{cl}^+)$, $\omega(t_{cl}^+)$, $x(t_{cl}^+)$, $y(t_{cl}^+)$, $z(t_{cl}^+)$).

Step 2. Construct a numerical energy function for the post-fault system using Equation 9 and compute the numerical potential energy at each time step of Step 1.

Homotopy-Based Approach Steps

Step 3. Detect the exit point ($u^*$, $w^*$, $x^*$, $y^*$) at which the projected fault-on trajectory ($u_f(t)$, $w_f(t)$, $x_f(t)$, $y_f(t)$) reaches the first local maximum (along the fault-on trajectory) of the numerical potential energy $U_{num}(u, w, x, y)$.

Step 4. Use the exit point ($u^*$, $w^*$, $x^*$, $y^*$) as the initial condition and solve equation 9.

Let the solution be ($u_{co}$, $w_{co}$, $x_{co}$, $y_{co}$).

Step 5. The CUEP with respect to the fault-on trajectory ($u(t)$, $w(t)$, $x(t)$, $y(t)$) of the original system is ($u_{co}$, $w_{co}$, $x_{co}$, $y_{co}$, 0).

Direct Stability Assessment Steps

Step 6. The critical energy, $V_{cr}$, is the value of the numerical energy function $W_{num}(u, w, x, y, z)$ at the CUEP; that is $v_{cr} = W_{num}(u_{co}, w_{co}, x_{co}, y_{co}, 0)$.

Step 7. Calculate the value of the numerical energy function $W_{num}(u, w, x, y, z)$ at the time of fault clearance ($t_{cl}$) by using the initial condition of the post-fault trajectory; that is, $$v_f = W_{num}(u(t_{cl}^+), \omega(t_{cl}^+), x(t_{cl}^+), y(t_{cl}^+), z(t_{cl}^+))$$

Step 8. If $v_f < v_{cr}$, then the initial condition of the post-fault trajectory ($u(t_{cl}^+)$, $\omega(t_{cl}^+)$, $x(t_{cl}^+)$, $y(t_{cl}^+)$, $z(t_{cl}^+)$) is located inside the stability boundary of the post-fault system; hence, the post-fault trajectory is stable. Otherwise, it may be unstable.

EXAMPLES ILLUSTRATING COMPUTING CONTROLLING UEP BY HOMOTOPY-BASED APPROACH

First Example

To demonstrate the idea of computing controlling UEP by homotopy-based approaches using exit point as an initial point, we have applied this method on a three-machine nine-bus system. This system is the popular Western System Coordinating Council (WSCC). See for reference, Hsiao-Dong Chiang, *Direct methods for stability analysis of electric power systems—theoretical foundation, BCU methodologies, and applications*. Wiley, N.J., 2011. The base MVA is 100 MVA and system frequency is 60 Hz. System configuration is shown in FIG. 14.

We have written a program in Fortran and the simulations were run on a 2.33 GHz/Core 2 Duo/64 bit machine with 2 GB memory and 160 GB hard drive. The program has succeeded in finding all the exit points of the designated 12 contingencies. The total time of evaluating these contingencies was 0.432 seconds (on average 36 ms per contingency). The pre-fault load flow results are shown in Table 1. The exit points associated with each contingency is shown in Table 2.

TABLE 1

Pre-Fault Load Flow Results

| | \|E\| (p.u.) | δ (rad) | $\tilde{\delta}$ (rad) | $P_m$ (p.u.) |
|---|---|---|---|---|
| Machine #1 | 1.107632 | 0.044823 | −0.048248 | 0.897915 |
| Machine #2 | 1.106539 | 0.218307 | 0.125237 | 1.343200 |
| Machine #3 | 1.057698 | 0.205717 | 0.112647 | 0.941900 |

TABLE 2

Contingency List details and the exit point of each contingency

| Contingency number | Fault at Bus | Line Trip From | Line Trip To | Exit point, (rad) $\tilde{\delta}_1$ | $\tilde{\delta}_2$ | $\tilde{\delta}_3$ |
|---|---|---|---|---|---|---|
| 1 | 4 | 4 | 5 | −0.83157 | 2.05223 | 2.16748 |
| 2 | 5 | 4 | 5 | −0.85604 | 2.24468 | 1.95048 |
| 3 | 4 | 4 | 6 | −0.82573 | 2.00656 | 2.22575 |
| 4 | 6 | 4 | 6 | −0.82663 | 2.00656 | 2.22575 |
| 5 | 5 | 5 | 7 | −0.77351 | 2.07331 | 1.66662 |
| 6 | 7 | 5 | 7 | −0.84828 | 2.68764 | 0.94769 |
| 7 | 6 | 6 | 9 | −0.75797 | 1.83370 | 2.05405 |
| 8 | 9 | 6 | 9 | −0.50293 | 0.51129 | 2.86278 |
| 9 | 7 | 7 | 8 | −0.73581 | 2.28572 | 0.91888 |
| 10 | 8 | 7 | 8 | −0.77159 | 1.74633 | 2.34681 |
| 11 | 8 | 8 | 9 | −0.76930 | 1.74136 | 2.33940 |
| 12 | 9 | 8 | 9 | −0.45872 | 0.48828 | 2.56452 |

Figure 3:
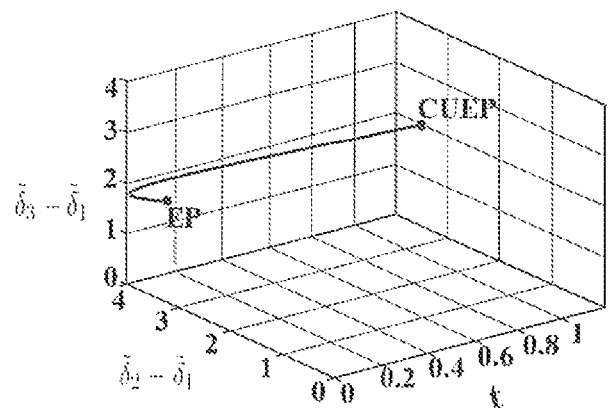
FIG. 3 is a three-dimensional plot illustrating the solution mapping trajectory of Newton-Homotopy-Contingency 1.
Figure 4:
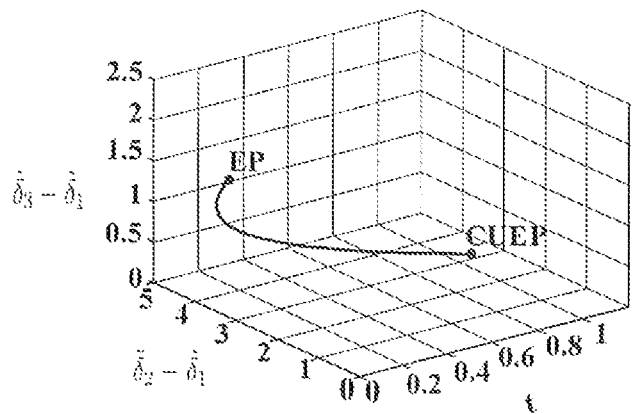
FIG. 4 is a three-dimensional plot illustrating the solution mapping trajectory of Newton-Homotopy-Contingency 2.
Figure 5:
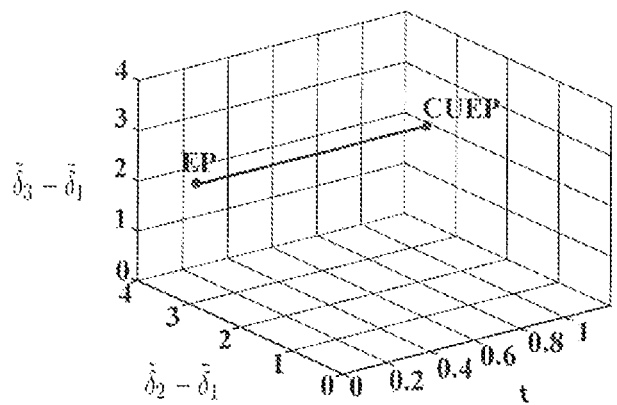
FIG. 5 is a three-dimensional plot illustrating the solution mapping trajectory of Newton-Homotopy-Contingency 3.
Figure 7:
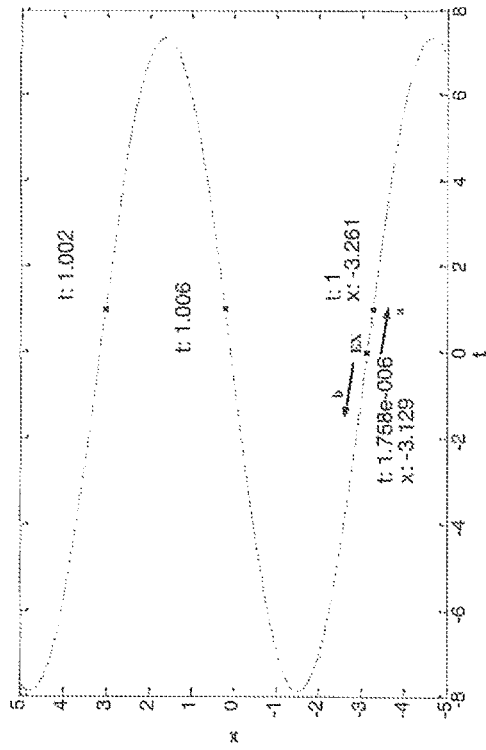
FIG. 7 is a graph depicting the trajectory of the homotopy function of the two bus system of FIG. 6 with fault at point C.

To show the solution trajectories of using Newton-Homotopy for these contingencies, we have selected machine #1 to be a reference for plotting purpose only in order for the trajectories to appear in three-dimension plots. That is, Machine #1 was taken as reference for the plotting only and the calculations were carried out using the Center of Inertia (COI) as a reference. FIGS. 3, 4 and 5 show the trajectories of the solutions for the first three contingencies. The trajectories show the solution process starting the exit points to the controlling UEP while changing the homotopy factor t.

The controlling UEPs of the 12 designated contingencies are shown in Table 3. Starting from the exit points of Table 2, the algorithm converged to these controlling UEPs. It can be seen that the computed controlling UEPs using homotopy-based approach are very close to the results provided in Hsiao-Dong Chiang, "Direct methods for stability analysis of electric power systems—theoretical foundation, BCU methodologies, and applications." Wiley, N.J., 2011, for the same system.

Second Example

Figure 6:
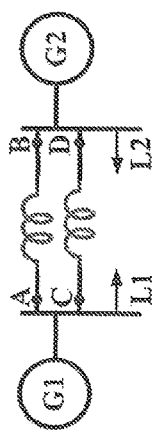
FIG. 6 is an exemplary circuit diagram depicting the configuration of a two generator system.

A two-bus system shown in FIG. 6 is presented here to demonstrate the homotopy method. The associated reduced-state model may be represented as follows:

$$0 = h_{COI_i}^1(V, \tilde{\theta}, \tilde{\delta})$$

$$0 = h_{COI_i}^2(V, \tilde{\theta}, \tilde{\delta})$$

$$\dot{\tilde{\delta}}_1 = P_{m_1} - P_{e_1}(\tilde{\delta}_1, \tilde{\theta}_1, V_1) - \frac{M_1}{M_T} P_{COI}$$

$$\dot{\tilde{\delta}}_2 = P_{m_2} - P_{e_2}(\tilde{\delta}_2, \tilde{\theta}_2, V_2) - \frac{M_2}{M_T} P_{COI}$$

In these equations, the variables $\tilde{\delta}_1$ and $\tilde{\delta}_2$ represent the exit points of the post-fault system.

The data are $P_{m1}=0.898$, $P_{m2}=1.3432$, $E_1=1.1$, $E_2=1.06$, $m_1=0.1254$, $m_2=0.034$, where $P_{m1}$, $P_{m2}$ are the mechanical power input of generator 1 and generator 2; $E_1$ and $E_2$ are the internal induced voltage of generator 1 and generator 2; $m_1$ and $m_2$ are the inertial coefficient of generator 1 and generator 2. The line impedance for each transmission line is 0.01+0.12j; the inner impedance of generators is 0.05j. The load demand of L1 and L2 are 50 MW+j30 MVar and 174 MW+100 MVar respectively. When there is a fault at point C, the breaker sheds transmission line C-D. If the angle reference of the two bus system is the internal point of generator 1, then the post-fault state equation can be presented as:

$$\dot{x} = 0.189 \cos(x) - 4.16 \sin(x) + 0.683.$$

where x is the angle of the internal point of generator 2.

If there is a fault at point C, the exit point calculated is $\tilde{\delta}_1 = 0.6667$, $\tilde{\delta}_2 = -2.4623$. If $\tilde{\delta}_1$ is set to be the angle reference, the angle of generator 2 x=−3.1290. Newton homotopy function constructed can be presented as:

$$H(x,t) = 0.189 \cos(x) - 4.16 \sin(x) + 0.683 + (1-t)*(-0.5464)$$

The exit point (x=−3.129, t=0) is set to be the initial point, the homotopy function trajectory would come across post-fault stable equilibrium point x=0.211 if it goes to direction a; and come across post-fault controlling UEP x=−3.261 if it goes to direction b.

If there is a fault at point D, the exit point calculated is $\tilde{\delta}_1 = -0.6727$, $\tilde{\delta}_2 = 2.4847$. If $\tilde{\delta}_1$ is set to be the angle reference, the angle of generator 2 x=3.1574. Newton homotopy function constructed can be presented as:

$$H(x,t) = 0.189 \cos(x) - 4.16 \sin(x) + 0.683 + (1-t)*(-0.5598)$$

Figure 8:
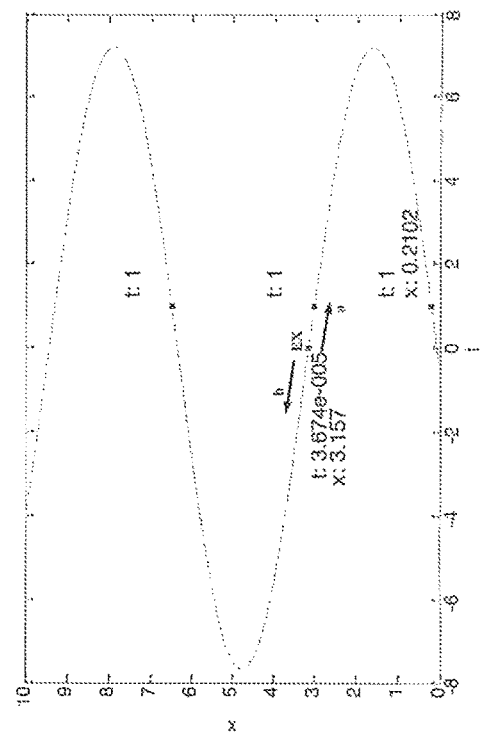
FIG. 8 is a graph depicting the trajectory of the homotopy function of the two bus system of FIG. 6 with fault at point D.

FIG. 8 presents the trajectory of the homotopy function. Where exit point (x=3.1574, t=0) is set to be the initial point, the homotopy function trajectory would come across post-fault stable equilibrium point x=3.022 if it goes to direction a; and come across post-fault controlling UEP x=6.4393 if it goes to direction b.

Figure 9:
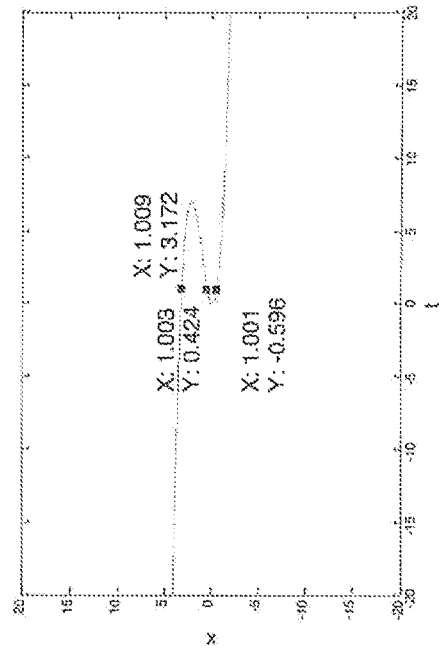
FIG. 9 is a graph depicting the trajectory of the homotopy function before mapping.
Figure 10:
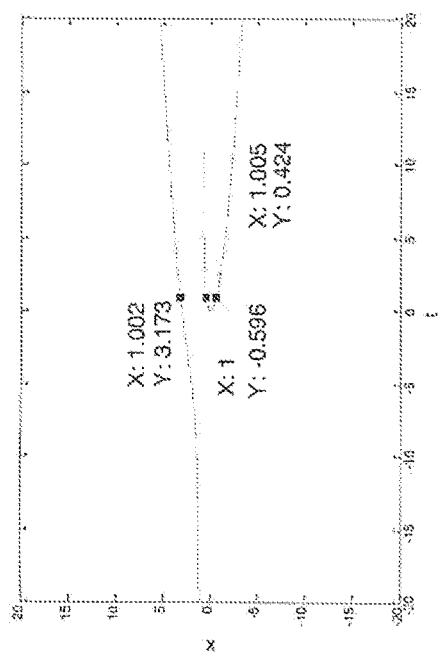
FIG. 10 is a graph depicting the trajectory of the homotopy function after mapping.

In the case when there is a pole in the state equations, the trajectory of the homotopy function will go to positive (negative) infinity and comes back from negative (positive) infinity at the two sides of the pole, which results in the separation of homotopy trajectory and prevents the initial solution to find the equilibrium points of the state equations. To overcome this, the disclosed technique employs a mapping method to map the infinite point to a finite point. The idea behind this is that by mapping the infinite point to a finite point, the two separating trajectories reaching infinity are brought back to reach a finite point. For example, for a one-dimensional dynamic equation $$\dot{x} = \frac{x^2(x-3)}{1-x} + 0.8,$$

the trajectory of homotopy function is shown in FIG. 9. It can be seen that if the initial solution $x_0$ is 2 for example, when the trajectory goes to negative direction, it can find solutions 0.424 and −0.596. When the trajectory goes to positive direction, it goes to infinity and fails to find the other solution. However, if the infinite point of the trajectory x=1, t=∞ (x=1 is the pole of the dynamic equation), is mapped to a finite point, such as x=1, t=3.5, the trajectory is shown in FIG. 10. An initial solution in this trajectory is very easily to find all three solutions at t=1.

Robustness of the Proposed Method

To test the robustness of the proposed method, we have applied it on a three-machine nine-bus system referenced above. We have studied all the possible N–1 contingencies over the transmission lines which are 12 contingencies (six lines with a fault at each end). Only three phase faults are assumed. The critical clearing times of the 12 contingencies range from 0.21 seconds to 0.5 seconds. We have assumed that the fault clearing time of all the designated list of contingencies is 0.3 seconds. All the classifications were performed according to this clearing time. If the energy margin of a certain contingency is larger than the energy margin at the controlling UEP, the contingency is classified unstable; otherwise the contingency is classified stable.

TABLE 3

The computed controlling UEPs of each contingency

| Contingency number | Fault at Bus | Line Trip From | Line Trip To | Controlling UEP, (rad) $\tilde{\delta}_1$ | $\tilde{\delta}_2$ | $\tilde{\delta}_3$ |
|---|---|---|---|---|---|---|
| 1 | 4 | 4 | 5 | −0.8323 | 2.0742 | 2.1447 |
| 2 | 5 | 4 | 5 | −0.8323 | 2.0742 | 2.1447 |
| 3 | 4 | 4 | 6 | −0.8266 | 2.0821 | 2.0540 |
| 4 | 6 | 4 | 6 | −0.8266 | 2.0821 | 2.0540 |
| 5 | 5 | 5 | 7 | −0.7598 | 1.9521 | 1.8071 |
| 6 | 7 | 5 | 7 | −0.7598 | 1.9521 | 1.8071 |
| 7 | 6 | 6 | 9 | −0.7586 | 1.8576 | 1.9979 |
| 8 | 9 | 6 | 9 | −0.7586 | 1.8576 | 1.9979 |
| 9 | 7 | 7 | 8 | −0.5430 | 2.1797 | −0.3764 |
| 10 | 8 | 7 | 8 | −0.3500 | 0.0738 | 2.5861 |
| 11 | 8 | 8 | 9 | −0.2915 | −0.1017 | 2.5004 |
| 12 | 9 | 8 | 9 | −0.2915 | −0.1017 | 2.5004 |

We have written a program in Fortran and the simulations were run on a 2.33 Ghz/Core 2 Duo/64 bit machine with 2 GB memory and 160 GB hard drive. The program has succeeded to find all the exit points, the post-fault SEPs and the controlling UEPs of the designated 12 contingencies. The pre-fault load flow results are shown in Table 1. The exit points associated with each contingency are shown in Table 2.

For this system, since the method has succeeded in finding all the exit points, the post-fault SEP and the controlling UEPs without any numerical problem, homotopy-based approaches did not have to be used. The screening results of this case are shown in Table 4. However, to test the robustness of the proposed screening tool, we have provided the algorithm with less accurate exit points by utilizing large step size in calculating the exit points. We have compared the results with the traditional iterative methods. In doing so, the iterative methods have failed to find the MGPs and the controlling UEPs. Therefore, if the homotopy-based approaches have not been utilized, the algorithm would perform time-domain simulations on the entire list of contingencies. The homotopy-based approaches have succeeded in calculating all the controlling UEPs and time-domain simulations were not used under these conditions. The classification results are shown in Table 5. To test the use of time-domain simulations, we have disturbed the exit points. In all the contingencies, the iterative method has failed to converge to the controlling UEPs and in two cases the homotopy-based approach has failed to find the controlling UEPs and converged to the post-fault SEPs. Under these conditions the time-domain simulations were performed of these two contingencies. The classification results are shown in Table 6. The second column in Table 6 represents the output of the screening tool before performing time-domain simulations.

To test the reliability and efficiency of the proposed screening tool, we have performed, on a separate program, time-domain simulations on the entire list of contingencies. For this small system, the proposed transient stability screening tool has shown absolute capture of the stable and unstable contingencies. We do not claim that this tool will perform perfectly for larger systems as it is for this small system. In a parallel work, we are testing reliability, efficiency and the speed of the proposed tool on large systems.

TABLE 4

The use of program components in the screening process

| Contingency number | Stable/ Unstable | Use of program components | | |
|---|---|---|---|---|
| | | Iterative methods | Homotopy | Time-domain |
| 1 | stable | Succeeded | — | — |
| 2 | stable | Succeeded | — | — |
| 3 | stable | Succeeded | — | — |
| 4 | stable | Succeeded | — | — |
| 5 | stable | Succeeded | — | — |
| 6 | unstable | Succeeded | — | — |
| 7 | stable | Succeeded | — | — |
| 8 | unstable | Succeeded | — | — |
| 9 | unstable | Succeeded | — | — |
| 10 | stable | Succeeded | — | — |
| 11 | stable | Succeeded | — | — |
| 12 | unstable | Succeeded | — | — |

TABLE 5

The use of program components in the screening process in case of using less accurate exit points

| Contingency number | Stable/ Unstable | Use of program components | | |
|---|---|---|---|---|
| | | Iterative methods | Homotopy | Time-domain |
| 1 | stable | Failed | Succeeded | — |
| 2 | stable | Failed | Succeeded | — |
| 3 | stable | Failed | Succeeded | — |
| 4 | stable | Failed | Succeeded | — |
| 5 | stable | Failed | Succeeded | — |
| 6 | unstable | Failed | Succeeded | — |
| 7 | stable | Failed | Succeeded | — |
| 8 | unstable | Failed | Succeeded | — |
| 9 | unstable | Failed | Succeeded | — |
| 10 | stable | Failed | Succeeded | — |
| 11 | stable | Failed | Succeeded | — |
| 12 | unstable | Failed | Succeeded | — |

TABLE 6

The use of program components in the screening process in case of disturbing the exit points

| Contingency number | Stable/ Unstable | Use of program components | | |
|---|---|---|---|---|
| | | Iterative methods | Homotopy | Time-domain |
| 1 | stable | Failed | Succeeded | — |
| 2 | stable | Failed | Succeeded | — |
| 3 | stable | Failed | Succeeded | — |
| 4 | stable | Failed | Succeeded | — |
| 5 | — | Failed | Failed | stable |
| 6 | unstable | Failed | Succeeded | — |
| 7 | stable | Failed | Succeeded | — |
| 8 | unstable | Failed | Succeeded | — |
| 9 | — | Failed | Failed | unstable |

TABLE 6-continued

The use of program components in the screening
process in case of disturbing the exit points

| Contingency number | Stable/ Unstable | Use of program components | | |
|---|---|---|---|---|
| | | Iterative methods | Homotopy | Time-domain |
| 10 | stable | Failed | Succeeded | — |
| 11 | stable | Failed | Succeeded | — |
| 12 | unstable | Failed | Succeeded | — |

Practical Applications

The homotopy-based approach in calculating the controlling UEP has a potential use in transient stability screening tools to classify a designated set of contingencies into stable and unstable subsets using transient stability direct methods. Screening and classification processes require sophisticated programs that can meet the requirements of on-line applications. Homotopy-based approaches can be adopted in the transient stability screening tools to calculate the desired solution. In transient stability screening of large systems, numerical problems in calculating pre-fault SEPs, exit points, MGPs and controlling UEPs are expected to be encountered. In the exiting transient stability screening tools using direct methods, if the iterative methods fail to converge to the desired solution, time-domain simulations are performed to check the stability. Therefore, if the number of contingencies that have numerical problems is very large, an excessive use of time-domain simulations is required and the screening tool may not meet the requirements of on-line applications.

The proposed method utilizes the advantages of the conservativeness of the direct methods to initially classify the designated set of contingencies into stable, "potentially" unstable and undecided subsets. The potentially unstable subset is further divided into stable, potentially unstable and undecided subsets along the solution trajectory towards the controlling UEP. The homotopy-based approaches can be utilized to increase the efficiency of the screening tool and to reduce the number of contingencies that need further analyses using time-domain simulations. The strategy of using direct method to filter out a large number of contingencies first and conducting further analysis on a much smaller number of contingencies makes the on-line transient stability screening feasible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of analyzing the stability of a networked power system, comprising:
   storing a reduced state model of the power system in memory of a computer and integrating over the model to derive a fault-on trajectory;
   storing in memory of the computer a numerical energy function for a post-fault condition of the power system;
   using the computer to compute an exit point at which a projected fault-on trajectory reaches a first local maximum of potential energy;
   using the exit point as an initial point and then using the computer to solve a post-fault reduced-state model;
   using the computer to determine a controlling unstable equilibrium point (CUEP) with respect to the projected fault-on trajectory of the networked power system by applying a homotopy algorithm that uses the exit point as an initial condition;
   solving the numerical energy function at the CUEP to determine a critical energy value;
   calculating a value of the numerical energy function at a time of fault clearance using an initial condition of the post-fault trajectory; and
   using the computer to test if the value of the numerical energy function is less than the critical energy value:
   (a) if so, reporting that the initial condition lies within a stability boundary; and
   (b) if not, reporting that the initial condition may be unstable.

2. The method of claim 1 wherein said homotopy algorithm employs a predictor-correction algorithm.

3. The method of claim 1 wherein said homotopy algorithm is of the form:

$$H(x,t)=tF(x)+(1-t)G(x)=0 \qquad (2)$$

wherein:
   t changes from 0 to 1 with an incremental step-size through a mapping process,
   $H(x, t)$ is a homotopy function,
   x represents a vector of system state variables,
   $F(x)$ is a function that represents dynamics of the networked power system, and
   $G(x)$ represents a known solution.

4. The method of claim 1 further comprising using at least one of (a) on-line monitoring detectors and (b) resistance-temperature detectors to measure conditions within the networked power system to generate real-time network condition data; and
   using the real-time network condition data with a computer to populate the reduced state model.

5. The method of claim 1 wherein the numerical energy function is a summation of a numerical potential energy and a kinetic energy.

6. The method of claim 1 wherein the numerical energy function is of the form:

$$W_{num}(u,w,x,y,z)=\tfrac{1}{2}z^TMz+U_{num}(u,w,x,y), \text{ and}$$

wherein:
   $W_{num}$ represents the numerical energy function,
   u represents a vector of system inputs,
   w represents a vector of constrained system state variables,
   x represents a vector of system state variables,
   y represents a vector of system response variables,
   z represents a derivative of the vector of system response variables,
   $z^T$ is a transpose of z,
   M represents a diagonal matrix of inertia constraints of the system, and
   $U_{num}$ represents a numerical potential energy function.

7. The method of claim 1 further comprising:
   receiving from a user through a computer human-machine interface, at least one if/then scenario corresponding to a proposed change to the networked power system; and using the method of claim 1 to assess whether the proposed change will result in a stable outcome.

8. The method of claim 7 further comprising in response to determining that the proposed change will result in an unstable outcome, providing the outcome to a remedial action device.

9. An analytical tool for assessing the stability of a networked power system comprising:
at least one data acquisition circuit electrically coupled to the power system, the acquisition circuit collecting and storing data reflective of a stability state of the power system as a data model stored in computer memory;
a stability analysis processor coupled to said computer memory to access said data model;
the stability analysis processor including a computer-readable medium storing instructions when executed by the processor cause the processor to:
a) compute an exit point at which a projected fault-on trajectory reaches a first local maximum of potential energy;
b) using the exit point as an initial point to solve a post-fault reduced-state model;
c) determine a controlling unstable equilibrium point (CUEP) with respect to the projected fault-on trajectory of the networked power system by applying a homotopy algorithm that uses the exit point as an initial condition;
d) solve a numerical energy function at the CUEP to determine a critical energy value;
e) calculate a value of the numerical energy function at a time of fault clearance using an initial condition of the post-fault trajectory; and
f) test if the value of the numerical energy function is less than the critical energy value:
if so, reporting that the initial condition lies within a stability boundary, and
if not, reporting that the initial condition may be unstable.

10. The tool of claim 9 further comprising a time-domain simulation engine implemented in the stability analysis processor to selectively assess stability conditions using transient stability assessment methods.

11. The tool of claim 9 wherein said data acquisition circuit comprises at least one of an on-line monitoring detector and a resistance-temperature detector.

12. The tool of claim 9 further comprising Kalman filter coupled to the at least one data acquisition circuit and configured to perform error correction upon raw data received from the data acquisition circuit.

13. The tool of claim 9 wherein the stability analysis processor includes a second user interface whereby a user submits at least one if/then scenario corresponding to a proposed change to the networked power system; and wherein the stability analysis processor is programmed to assess whether the proposed change will result in a stable outcome.

14. The tool of claim 13 wherein the computer-readable medium stores instructions when executed by the processor cause the processor to:
g) in response to determining that the proposed change will result in an unstable outcome, provide the outcome to a remedial action device.

15. The tool of claim 9 wherein the stability analysis processor includes a data storage medium configured to store results of said step of testing if the value of the numerical energy function is less than the critical energy.

16. The tool of claim 9 wherein the stability analysis processor includes a user interface whereby a user gains access to the stored results in said data storage medium as an indication of the stability of the power system.

17. A non-transitory computer-readable medium storing instructions which when read and operated upon by a processor cause the processor to perform a method of analyzing stability of a networked power system, comprising:
storing a reduced state model of the power system in memory of a computer and integrating over the model to derive a fault-on trajectory;
storing in memory of the computer a numerical energy function for a post-fault condition of the power system;
using the computer to compute an exit point at which a projected fault-on trajectory reaches a first local maximum of potential energy;
using the exit point as an initial point and then using the computer to solve a post-fault reduced-state model;
using the computer to determine a controlling unstable equilibrium point (CUEP) with respect to the projected fault-on trajectory of the networked power system by applying a homotopy algorithm that uses the exit point as an initial condition;
solving the numerical energy function at the CUEP to determine a critical energy value;
calculating the value of the numerical energy function at a time of fault clearance using an initial condition of the post-fault trajectory; and
using the computer to test if the value of the numerical energy function is less than the critical energy value:
(a) if so, reporting that the initial condition lies within a stability boundary; and
(b) if not, reporting that the initial condition may be unstable.

18. The non-transitory computer-readable medium of claim 17 further comprising instructions which when read and operated upon by the processor cause the processor to:
receive from a user through a computer human-machine interface, at least one if/then scenario corresponding to a proposed change to the power system;
assess whether the proposed change will result in a stable outcome; and
in response to determining that the proposed change will result in an unstable outcome, provide the outcome to a remedial action device.

* * * * *